Nov. 1, 1938.　　　W. H. WILSON　　　2,135,205
TRACTOR-TRAILER COMBINATION
Filed Dec. 9, 1937　　　3 Sheets-Sheet 2
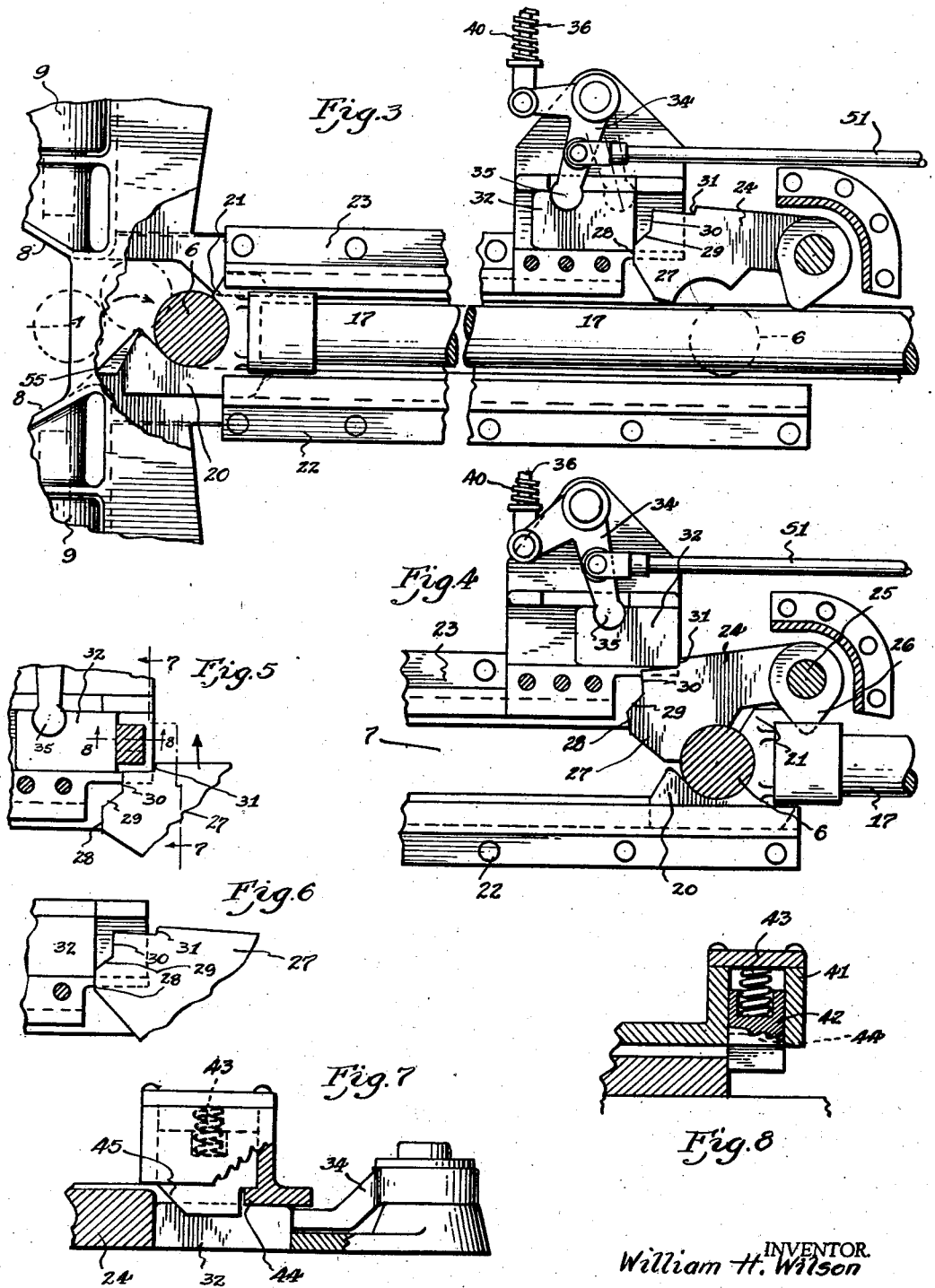
INVENTOR.
William H. Wilson
BY
Berner, Kenelle, Laughlin & Rauch
ATTORNEYS Nov. 1, 1938.  W. H. WILSON  2,135,205
TRACTOR-TRAILER COMBINATION
Filed Dec. 9, 1937  3 Sheets-Sheet 3

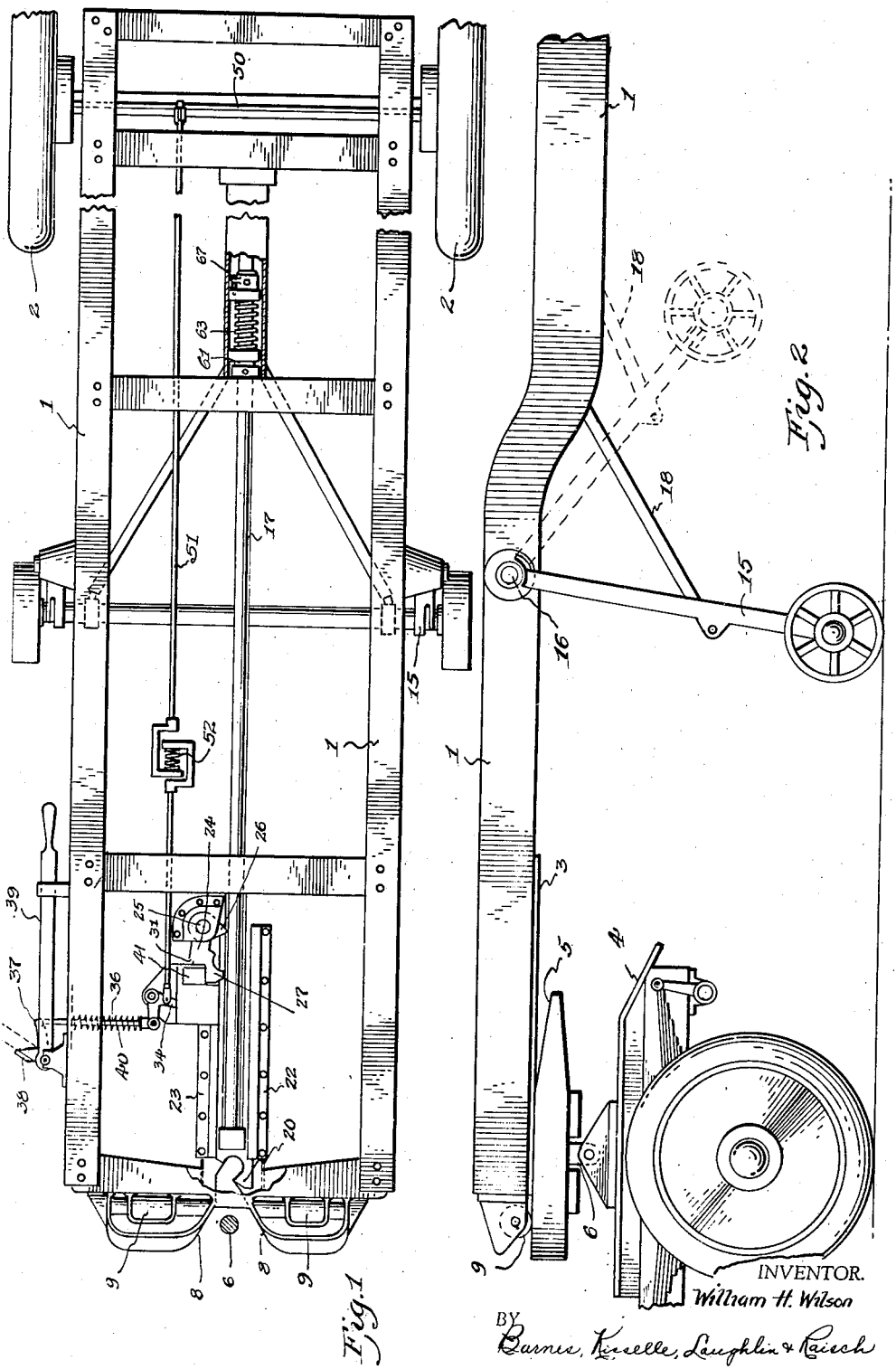

INVENTOR.
William H. Wilson
BY
Barnes, Kisselle, Laughlin & Rauch
ATTORNEYS

Patented Nov. 1, 1938

2,135,205

UNITED STATES PATENT OFFICE 2,135,205

TRACTOR-TRAILER COMBINATION

William H. Wilson, Detroit, Mich.

Application December 9, 1937, Serial No. 178,853

15 Claims. (Cl. 280—33.1)

This invention relates to tractor-trailer combinations, and has to do particularly with what is usually termed a semi-trailer where the forward end of the trailer rests upon the tractor through the means of a fifth wheel coupling or the equivalent thereof.

The invention is directed particularly to an improved coupling construction for detachably coupling the trailer to the tractor. The tractor may have a lower fifth wheel member and the trailer may have an upper fifth wheel member and there is a king pin on one for engaging a latch or socket means on the other. In accordance with this invention the king pin may advantageously be on the tractor.

Semi-trailers of the detachable type are usually provided with supporting legs for supporting the forward end when they are detached from the tractor. One of the principal objects of this invention is to provide an improved construction wherein the tractor, as it moves away from the trailer in the uncoupling action, pulls the supporting legs on the trailer into supporting position. At a predetermined point a release is effected between the part on the tractor doing the pulling and the part on the trailer which is being pulled. This release is effected in a novel manner without requiring any operation or actuation of a latch or draft coupling; to the contrary, relative movements between the tractor and trailer themselves, or parts thereof, are used to bring about this disconnection. When the coupling between the tractor and trailer is made, the tractor and trailer again go through this stage of relative movement for establishing the connection for operating the supporting legs. This relative movement, both in uncoupling and in coupling, takes place about the time the tractor is leaving the trailer in uncoupling, and in the early stages of the coupling action, while the draft connection between the tractor and trailer is made only after the trailer has moved on to the trailer a considerable distance. In uncoupling a tractor and semi-trailer, the first thing to be done is that of releasing the draft coupling; then as the tractor pulls forward relative to the trailer, the supporting legs of the trailer are pulled into supporting position, and finally by the relative movement of the tractor and trailer, as above mentioned, the connection for pulling the legs into supporting position is broken.

In the accompanying drawings:

Fig. 1 is a top plan view illustrating the chassis of the trailer embodying the invention.

Fig. 2 is a side elevational view illustrating the forward end of the trailer frame and the fifth wheel of the tractor.

Fig. 3 is an enlarged view with parts cut away illustrating the trailer construction and the relative position of the king pin on the tractor at the point of disconnection.

Fig. 4 is a view illustrating the draft coupling in coupled arrangement.

Fig. 5 is a view partly in section illustrating the position of the draft latch at the beginning of the uncoupling action.

Fig. 6 illustrates the position of the latch after the tractor has pulled away from the draft coupling.

Fig. 7 is a cross sectional view taken substantially on line 7—7 of Fig. 5.

Fig. 8 is a cross sectional view taken substantially on line 8—8 of Fig. 5.

Figure 9:
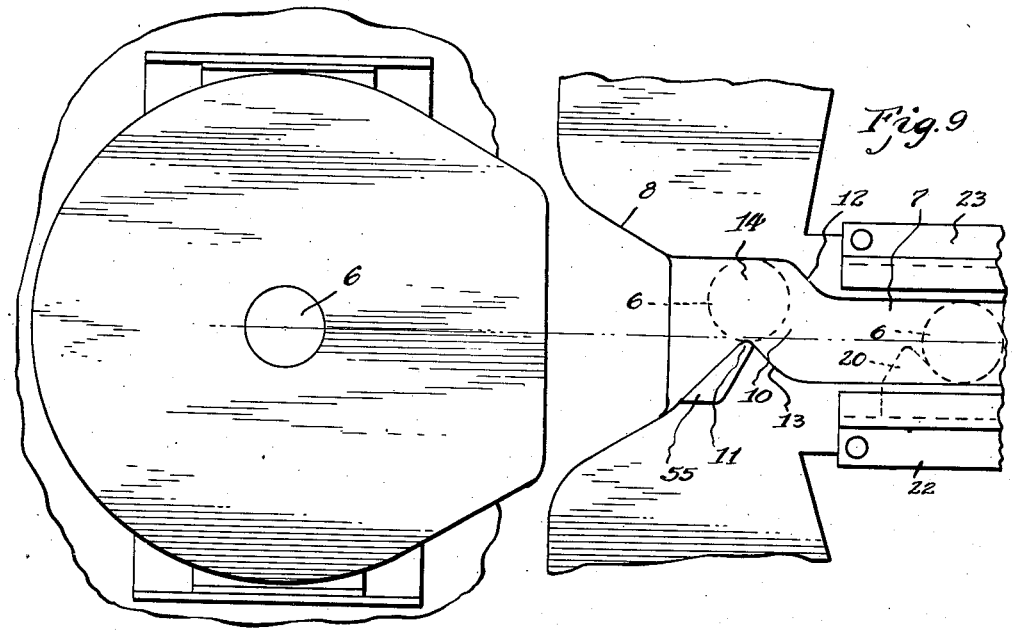
Fig. 9 is a view with parts cut away illustrating the fifth wheel and king pin on the tractor and the slot or throat on the trailer for the reception of the king pin.

The frame of a trailer is generally illustrated at 1, and it has running gear at its rear end as illustrated by the wheels 2. The forward end is provided with an upper fifth wheel member 3 which may be in the form of one or more plates secured to the frame. The rear end of a tractor is illustrated at 4, and it is provided with a lower fifth wheel member 5 mounted to rock on an axis as at 6. This fifth wheel member is preferably arranged to normally incline rearwardly so that when the tractor is backed into the semi-trailer, the semi-trailer rides up the incline and then the lower fifth wheel swings on its pivot for surface to surface engagement with the upper fifth wheel member 3. This construction, however, is known to those versed in the art.

The draft coupling between the tractor and semi-trailer is preferably accomplished through the means of a king pin and a latch for engaging the king pin. Advantageously the king pin is on the rocking fifth wheel of the tractor as shown at 6. The upper fifth wheel on the trailer is provided with a slot or throat 7 which slidably receives the king pin and which opens divergingly as at 8. The diverging walls guide the king pin into the throat. The trailer may have rollers 9 at its forward end for riding up on the inclined fifth wheel member 5, but these rollers may take no substantial load when the fifth wheel members are in engagement as shown in Fig. 2.

As the tractor backs in to the trailer, the king pin is guided by the converging surfaces of the opening 8 and ultimately the king pin moves back into the slot 7, but this movement is not in a straight line. The throat has an angularly extending portion or guide way 10 which is defined by a projection or abutment 11. The angularly extending portion is defined by a wall 12 on one side and a wall 13 on the other, which wall is one side of the abutment 11. The angular portion 10 connects into the diverging opening 8 by a throat 14. Thus the guiding entrance way for the king pin and the throat 14 are laterally offset relative to the slot 7. The slot 7 preferably is centrally disposed transversely of the trailer frame.

The supporting legs of the trailer are illustrated at 15 pivotally mounted to the trailer frame as at 16. A service rod 17 is mounted in the trailer frame for longitudinal reciprocation, and it is connected to the supporting legs by links 18, the connection being shown in detail in Fig. 10.

The forward end of the service rod is provided with a head having a hook portion 20 and a heel 21 and guideways 22 and 23 are formed on opposite sides of the slot 7 to guide the head in its movement. A draft latch 24 is pivotally mounted into the trailer as at 25 and it has a heel 26. The arm of the latch has a hook portion 27, a surface 28 next adjacent a cam surface 29, and another surface 30 and an abutment 31.

A locking member 32 is slidably mounted, and this locking member may be manipulated by means of a bell-crank 34 having a connection with the member as at 35. One arm of the bell-crank is connected to a rod 36 in turn pivotally connected to a bell-crank 37 mounted on a side of the frame and having one arm 38 positioned to be engaged by a manually operable lever 39. A spring 40 may surround the rod 36 to normally urge the bell-crank 34 into the position shown in Fig. 4 and thus serves to project the locking member 32.

There is a housing 41 adjacent the locking member 32 in which there is a slidable detent 42 acted upon by a spring 43. In the particular arrangement shown the spring 43 tends to shift the detent downwardly but its downward movement is limited by a projection 44.

The parts are shown coupled in Fig. 4. This is the draft connection between the tractor and trailer. When it is desired to uncouple the tractor and trailer the operator swings the lever 39 counter-clockwise as Fig. 1 is viewed, the lever engaging the arm 38, and through the rod 36, swings the bell-crank 34 to a position substantially as illustrated in Fig. 3. This retracts the locking member 32 and the spring pressed detent is projected downwardly in front of the locking member as shown in Figs. 5 and 7. The tractor may now move forward, and in doing so that latch 24 is swung on its pivot. In the early stages of its movement, it engages an inclined face 45 of the detent and raises it against the action of the spring 43 until it releases the locking member. The locking member is then projected by its spring 40 until it engages the surface 30 of the latch. This projection is slight as there is merely a working clearance between the surface 30 of the latch and the locking member in its retracted position. Upon continued movement of the king pin forwardly the cam surface 29 pushes the locking member 32 against the action of its spring 40 and ultimately the surface 28 of the latch blocks the locking member and holds it retracted against its spring as shown in Fig. 6. At this time the detent 42 rides upon the surface of the latch 24. While the king pin was moving forwardly it was also pulling the hook 20, the details of which movement will be considered later. When the tractor and trailer are separated, the draft latch remains in the position as shown in Figs. 3 and 6. When the coupling is established the king pin moves backwardly in the slot 7 and the heel 21 strikes heel 26 and swings the latch to the Fig. 4 position to establish the draft coupling. At this time the locking member 32 is projected into locking position and may be projected by its spring until it abuts against the shoulder 31 of the latch. It will be noted by reference to Fig. 7 that the latch 24 has its upper surface higher than the locking member 32 so that in this coupling action the latch is projected towards locked position while the detent still rides upon the higher surface of the latch.

This latching arrangement is associated with the brakes of the vehicle. A rocker arm for the brakes of the wheels of the semi-trailer is shown at 50, and it is connected to the bell-crank 34 by a brake rod 51 which preferably has a spring mounted therein as at 52. When the operator pulls the lever 39 to shift the locking member to the Fig. 5 position, the brakes are manually applied and held applied by the detent 42. As the tractor moves away and the detent 42 is raised to release the locking member, the locking member is projected slightly until it engages the surface 30, but there has been enough compression placed in the spring 52 so that the brakes remain on. As the uncoupling action is continued the cam surface 29 acts upon the locking member 32 to increase the tightening of the brakes which is accomplished through further compression of the spring 52. The brakes will remain on so long as the trailer is disconnected from the tractor. Of course, when the coupling is established as above pointed out, the brakes are released.

It will be noted that as the king pin moves fore and aft in the slot 7 that it shifts the service rod 17 with like motion. The king pin has a nice fit in the slot 7 so as to have substantially no lateral movement therein, and, therefore, the connection is established between the hook 20 and the king pin so long as the king pin is in the main portion of the slot 7. However, as the king pin moves to the forward end of the slot, the nose of the hook comes into substantial alignment with the projection 11 and its forward movement may be stopped by an abutment 55. At this time the king pin reaches the angularly extending guideway 10 of the slot, and is caused to move laterally around the projection 11 substantially as illustrated by the dotted line positions of the king pin shown in Fig. 3. In this manner the connection between the king pin and the service bar is released without any actuation or articulation of the coupling members or jaws, and without actuation of a draft coupling. The draft coupling is afforded by the latch 24, whereas the connection between the king pin and hook 20 is merely a service connection.

The relative movement required by the king pin moving through the guideway 10 may take place in one of several ways, or by a combination of such ways. If the trailer is on a smooth highway it may merely swing laterally on its rear traction wheels; there may be sufficient weave in the trailer frame or tractor construction to accomplish this lateral movement; the spring and shackle connections on the tractor may provide the lateral movement. This lateral movement may be accomplished by a combination of these movements. In any event, the lateral movement is relatively small as compared to the length and breadth of the combined vehicle, and no difficulty will be found in effecting this lateral movement.

With the construction shown the opening 8 and the main part of the slot 7 are laterally offset relative to each other. When the coupling is to be established the tractor and semi-trailer must again partake of this lateral movement as the king pin moves rearwardly into the opening 7, past the projection 11, through the inclined part of the slot 10, and finally into the main part 7. The king pin seats into the hook 20 substantially as it comes into alignment with the main part of the slot 7, then as it continues to move rearwardly the service bar is shifted rearwardly until the Fig. 5 position is reached where the draft latch is tripped as above pointed out.

Figure 10:
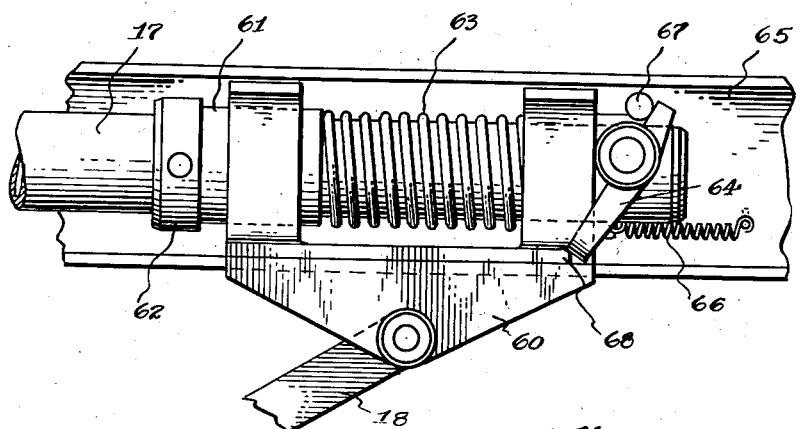
Fig. 10 is an enlarged detail view illustrating one form of a construction which may be used to connect the service bar of the tractor to the supporting legs.

The connection between the links 18 and the service bar is shown in Fig. 10. This arrangement is preferably such as to lock the legs in supporting position so that the legs are held from swinging to a non-supporting position during that time when the front of the trailer is dropping from the tractor on to the legs. This structure is disclosed in the Land Patent No. 2,089,493, and may be referred to only in general here. A bracket 60 is secured to the links 18, and it is slidably mounted on a sleeve 61 having a collar 62 with a coil spring 63 interposed between the sleeve 61 and one part of the bracket. A lever 64 is pivotally mounted to the structural member 65 and acted upon by a spring 66, and on the service rod is a trip member 67. When the legs are pulled in a downward position and preferably moved over center as shown in Fig. 2, the lever 64, moving under the action of the spring 66, engages shoulder 68 on the bracket to hold the legs from swinging backwardly. In making the coupling between the tractor and trailer the king pin first shifts the service rod 17 rearwardly and the spring 63 is compressed. The trip member 67 swings the lever 64 until it disengages the shoulder 68 and then continued rearward movement of the king pin relative to the trailer may raise and hold the legs in non-operating position.

I claim:

1. The combination with a tractor and semi-trailer having cooperating fifth wheel members, a king pin on the tractor, the trailer having a slot opening at its forward end for the reception of the king pin, coupling means adjacent the rear end of the slot for coupling with the king pin, said slot having a laterally extending portion constructed to cause the king pin to shift laterally of the fifth wheel member on the trailer as the king pin moves into and out of the slot, and a service member on the trailer having a part arranged to receive and release the king pin substantially at the location of the laterally extending portion as the king pin shifts laterally respectively in moving into and out of the slot.

2. The combination with a tractor member and a semi-trailer member having cooperating fifth wheel portions, of a king pin on one member, a slot for the king pin on the other member which is open at one end for the reception of the king pin, coupling means adjacent the opposite end of the slot for engaging the king pin, said slot having a laterally extending portion defined by sides both extending laterally toward the same side of the trailer for causing relative lateral movement between the tractor and semi-trailer as they are connected and disconnected, and a service member on the trailer reciprocable by a portion of the tractor and having a part formed so as to be engageable with and disengageable from said portion on the tractor incident to said lateral movement as the tractor and semi-trailer are being coupled and uncoupled respectively.

3. The combination with a tractor member and a semi-trailer member having cooperating fifth wheel portions, a projection on one member, the other member having a slot open at one end for the reception of the projection, said slot having laterally offset portions connected by a laterally extending portion for causing relative lateral movement between the tractor and trailer members as they are coupled and uncoupled, means for coupling the tractor and semi-trailer when the projection is adjacent the closed end of the slot, and a service member on the trailer engageable with and disengageable from a device on the tractor incident to the relative lateral movement between the tractor and semi-trailer as they are coupled and uncoupled respectively.

4. The combination with a tractor and semi-trailer having cooperating fifth wheel members, a projection on the tractor, the trailer having a slot open at one end for the reception of the projection, said slot having a laterally extending portion with the ends of the laterally extending portion offset laterally for causing relative lateral movement between the tractor and semi-trailer as the projection moves therethrough in coupling and in uncoupling, and a service member on the trailer having a part formed to be engageable with and disengageable from a device on the tractor incident to said lateral movement as the tractor and semi-trailer are respectively coupled and uncoupled.

5. The combination with a tractor and semi-trailer having cooperating separable fifth wheel members, a king pin on the tractor, the trailer having a fore and aft extending slot open at its forward end for the reception of the king pin, draft coupling means for the king pin when it is substantially at the rear end of the slot, said slot having offset portions connected by a laterally inclined portion spaced forwardly from its rear end for causing relative lateral movement between the fifth wheel members as the king pin moves therethrough, a reciprocable service member on the trailer which is reciprocated by the king pin and having a portion reciprocable substantially from the rear of the slot to the lateral portion of the slot, and said portion being constructed to receive and release the king pin incident to the lateral movement.

6. The combination with a tractor and semi-trailer having cooperating separable fifth wheel members, a king pin on the tractor, the trailer having a fore and aft extending slot open at its forward end for the reception of the king pin, draft coupling means for the king pin when it is substantially at the rear end of the slot, said slot being offset and having a laterally inclined portion spaced forwardly from its rear end for causing relative lateral movement between the fifth wheel members as the king pin moves therethrough, a reciprocable service member on the trailer reciprocated by the king pin and having an open sided hook reciprocable substantially from the rear of the slot to the lateral portion, and engageable with and disengageable from the king pin as the king pin moves through said lateral portion in coupling and uncoupling respectively.

7. The combination with a tractor and semi-trailer having cooperating separable fifth wheel members, a king pin on the fifth wheel member of the tractor, the fifth wheel member on the trailer having an opening for initial reception of the king pin in coupling and having a fore and aft extending slot positioned rearwardly of the opening and in which the king pin slides, said slot being offset laterally from the opening, a laterally inclined guideway connecting the opening and the slot for causing relative lateral movement between the fifth wheel members as the king pin passes through the guideway in the coupling and uncoupling operations, draft coupling means for the king pin when it is substantially at the rear end of the slot, a reciprocable service bar on the trailer having an open sided hook reciprocable substantially from the rear of the slot to the guideway, means for guiding the hook in a path parallel to the slot, said hook being engageable with and disengageable from the king pin as it moves through the guideway during the coupling and uncoupling operations.

8. In a semi-trailer for connection to a tractor having an upstanding king pin, a fifth wheel member having an opening for the reception of the king pin, a fore and aft extending slot extending rearwardly from the opening and offset laterally relative thereto, a laterally inclined guideway connecting the opening and the slot for causing relative lateral movement between the king pin and the fifth wheel member in the coupling and uncoupling operations, means for establishing a draft connection with the king pin when the same is substantially at the rear of the slot, a reciprocable service member on the trailer having a hook shaped portion slidable substantially from the rear of the slot to the guideway, means restraining the hook shaped member from lateral movement relative to the fifth wheel member on the semi-trailer, said hook shaped portion being engageable with and disengageable from the king pin as the same moves through the guideway in the coupling and uncoupling operations respectively.

9. In a semi-trailer for connection to a tractor having an upstanding king pin, a fifth wheel member having an opening for the reception of the king pin, a fore and aft extending slot extending rearwardly from the opening and offset laterally relative thereto, a laterally inclined guideway connecting the opening and the slot for causing relative lateral movement between the king pin and the fifth wheel member on the semi-trailer in the coupling and uncoupling operations, means for establishing a draft connection with the king pin when the same is substantially at the rear of the slot, a reciprocable service member on the trailer having a hook shaped portion slidably substantially from the rear of the slot to the guideway, means restraining the hook shaped member from lateral movement relative to the fifth wheel member on the semi-trailer, said hook shaped portion being engageable with and disengageable from the king pin as the same moves through the guideway in the coupling and uncoupling operations respectively, and supporting legs for the semi-trailer operably connected to the service member and operated to and from supporting position by power delivered through the service member by the king pin.

10. The combination with a tractor and semi-trailer having cooperating separable fifth wheel members, a king pin on the tractor, the fifth wheel member on the semi-trailer having a slot for receiving the king pin, a draft latch for engaging the king pin, a spring pressed locking member for holding the latch in engagement with the king pin, means for retracting the locking member, brakes on the semi-trailer, a brake rod connecting the brakes and the said means, whereby the brakes are applied upon operation of the means to retract the locking member, a detent for holding the locking member retracted, said king pin being arranged to swing the draft latch to uncoupled position as the tractor moves away from the semi-trailer, means including an inclined plane whereby said swinging movement of the draft latch shifts the detent out of its holding position, and a surface on the latch for holding the locking member in retracted position with the brake applied subsequent to the movement of the detent out of a holding position.

11. The combination with a tractor and semi-trailer having cooperating separable fifth wheel members, a king pin on the tractor, the fifth wheel member on the semi-trailer having a slot for receiving the king pin, a draft latch for engaging the king pin, a spring pressed locking member for holding the latch in engagement with the king pin, means for retracting the locking member, brakes on the semi-trailer, a brake rod connecting the brakes and the said means, whereby the brakes are applied upon operation of the means to retract the locking member, a detent for holding the locking member retracted, said king pin being arranged to swing the draft latch to uncoupled position as the tractor moves away from the semi-trailer, means including an inclined plane whereby said swinging movement of the draft latch shifts the detent out of its holding position, and an inclined surface on the latch operable to retract the locking member incident to further swinging movement of the draft latch to increase the brake-applying force and for holding the locking member in unlocked position.

12. The combination with a tractor and semi-trailer having cooperating separable fifth wheel members, a king pin on the tractor, the fifth wheel member on the semi-trailer having a slot for receiving the king pin, a draft latch for engaging the king pin, a spring pressed locking member for holding the latch in engagement with the king pin, means for retracting the locking member, brakes on the semi-trailer, a brake rod connecting the brakes and the said means, whereby the brakes are applied upon operation of the means to retract the locking member, a detent for holding the locking member retracted, said king pin being arranged to swing the draft latch to uncoupled position as the tractor moves away from the semi-trailer, means including an inclined plane whereby said swinging movement of the draft latch shifts the detent out of its holding position, an inclined surface on the latch operable to retract the locking member incident to further swinging movement of the draft latch to increase the brake-applying force and for holding the locking member in unlocked position, and spring means positioned in the brake line for taking up some of the additional brake-applying force.

13. The combination with a tractor and semi-trailer having cooperating separable fifth wheel members, a king pin on the tractor, the fifth wheel member on the semi-trailer having a slot for receiving the king pin, a draft latch for engaging the king pin, a spring pressed locking member for holding the latch in engagement with the king pin, means for retracting the locking member, brakes on the semi-trailer, a brake rod connecting the brakes and the said means, whereby the brakes are applied upon operation of the means to retract the locking member, a detent for holding the locking member retracted, said king pin being arranged to swing the draft latch to uncoupled position as the tractor moves away from the semi-trailer, means including an inclined plane whereby said swinging movement of the draft latch shifts the detent out of its holding position, an inclined surface on the latch operable to retract the locking member incident to further swinging movement of the draft latch to increase the brake-applying force and for holding the locking member in unlocked position, spring means positioned in the brake line for taking up some of the additional brake-applying force, and means for swinging the latch into locking engagement with the king pin as the king pin comes into position in the coupling operation.

14. In a semi-trailer for use with a tractor having a king pin, a longitudinal guide-way opening at the forward end of the trailer and adapted to receive the king pin and having laterally offset portions connected by a laterally extending portion, a service member on the semi-trailer shiftable along the guide-way and having king pin engaging means constructed to receive and release the king pin as it moves laterally through said laterally extending portion of the guide-way for shift of the service member by the king pin and draft coupling means for engaging the king pin.

15. The combination with a tractor and semi-trailer having separable fifth wheel members, the fifth wheel member on the tractor having a king pin thereon, the fifth wheel member on the semi-trailer having a longitudinally extending slot for receiving and guiding the king pin in coupling and uncoupling operations and a laterally enlarged guideway at the front of the fifth wheel member on the trailer into which the slot opens, of a slidably mounted service member on the trailer, a hook member mounted on the service member for hooking on to the king pin and slidable with the service member along said slot and substantially parallel thereto, said hook member opening laterally of the slot and with its forward portion extending crosswise of the slot so that the king pin and hook member are held in engagement so long as the king pin is in said slot for actuation of the service member by the king pin, the service member being slidable forwardly to a position where the lateral opening of the hook member opens into said guideway, for movement of the king pin around the said forward portion of the hook member by relative lateral movement between the king pin and hook member in uncoupling and for movement of the king pin into the hook member in coupling.

WM. H. WILSON.